May 15, 1934.  J. M. MILAN  1,958,922
MOTOR VEHICLE BRAKE
Filed Sept. 27, 1932  3 Sheets-Sheet 1

Inventor
Joseph M. Milan

By Clarence A. O'Brien
Attorney

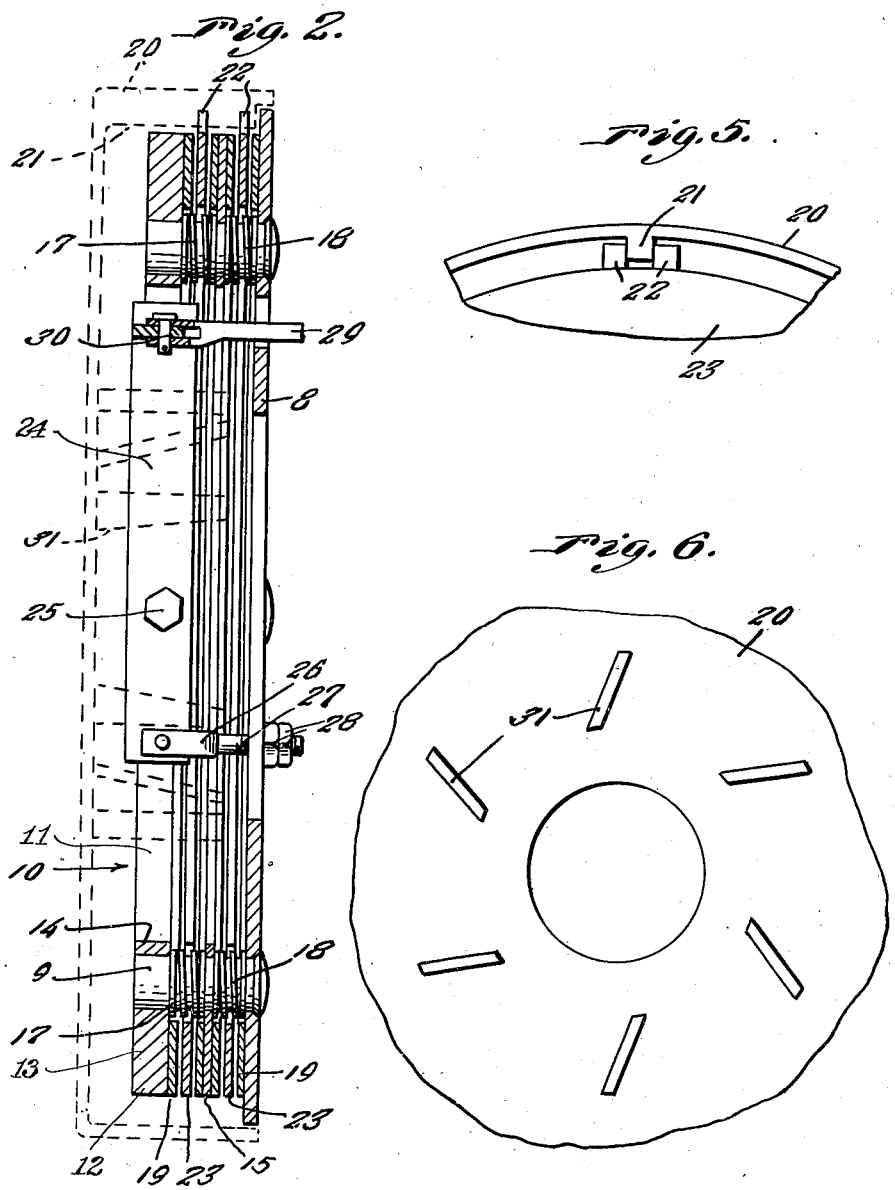

May 15, 1934. J. M. MILAN 1,958,922
MOTOR VEHICLE BRAKE
Filed Sept. 27, 1932  3 Sheets-Sheet 3
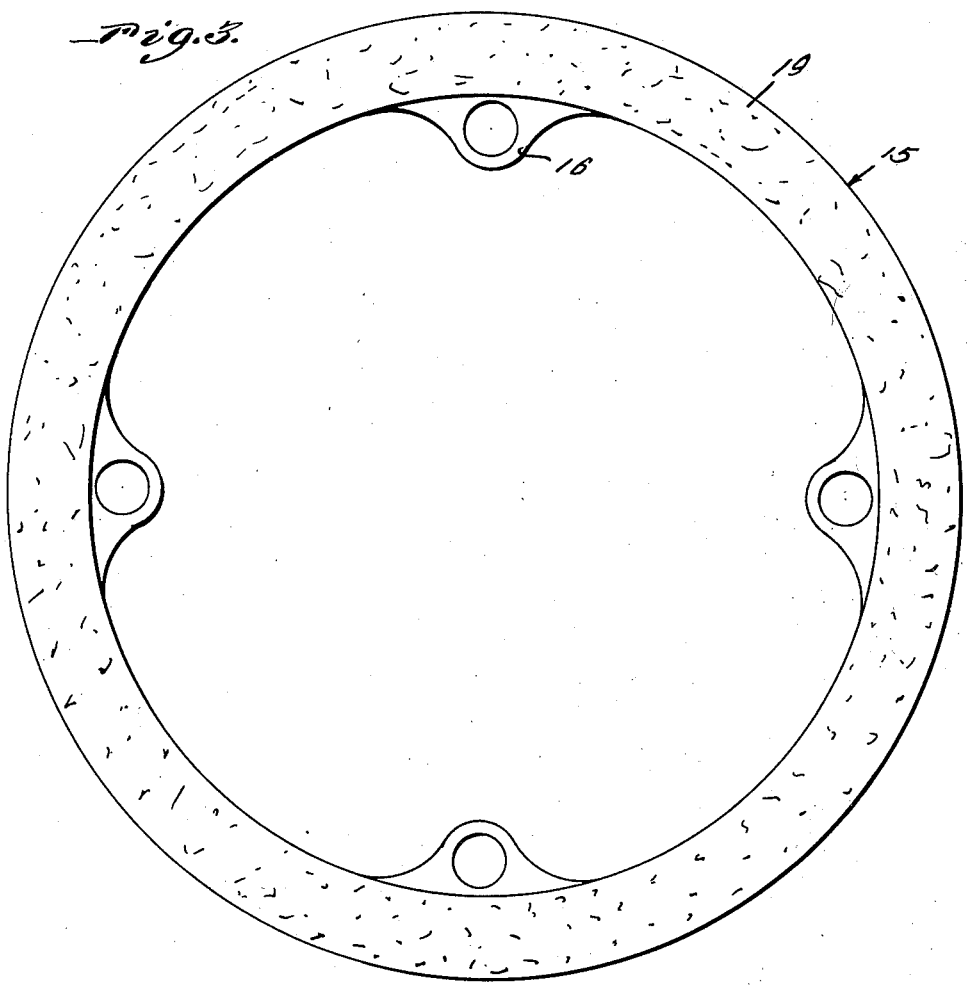
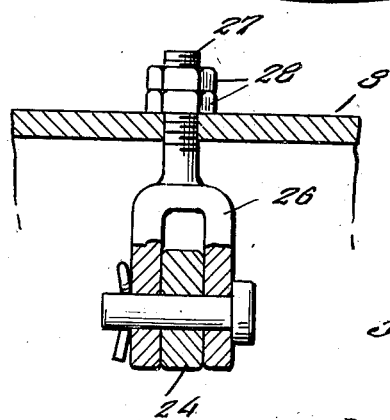
Inventor
Joseph M. Milan
By Clarence A. O'Brien
Attorney Patented May 15, 1934

1,958,922

UNITED STATES PATENT OFFICE 1,958,922

MOTOR VEHICLE BRAKE

Joseph M. Milan, Alhambra, Calif.

Application September 27, 1932, Serial No. 635,068

1 Claim. (Cl. 188—72)

This invention relates to an improved mechanical brake for motor vehicles and it has more specific reference to a novel, multiple disk type brake.

Briefly stated, novelty is predicated upon a structure embodying two groups of mechanical elements wherein one group is relatively stationary, and the companion group relatively movable, said elements being so shaped and interrelated as to produce the requisite frictional action necessary to develop the required braking action for positive and dependable results.

The purpose of the invention is to provide a structurally improved and refined arrangement which is simple, economical, dependable, and otherwise satisfactory and practicable in accomplishing the desired result in a commendable manner.

Other features and advantages of the invention will become more readily apparent from the following description and drawings.

In the drawings:

Figure 3 is a detail view of one of the elements of the relatively fixed or stationary group.

Figure 4 is a detail section taken approximately on the plane of the line 4—4 of Figure 1.

Figure 5 is a detail elevational view.

Figure 6 is a fragmentary elevation of a part of the brake drum.

Figure 7 is a detail section through the rim of the brake drum.

Figure 1:
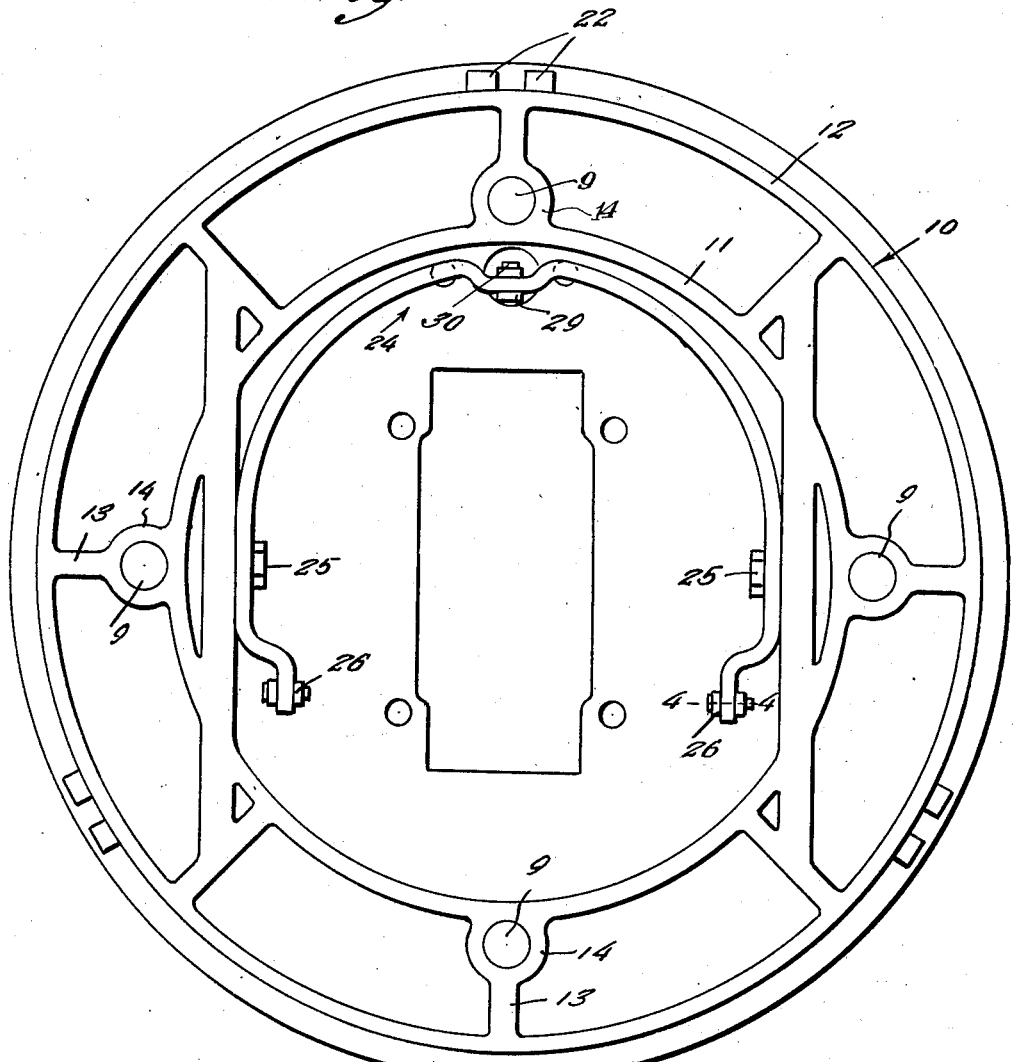
Figure 1 is an elevational view showing the essential features of the invention with the brake drum removed.
Figure 2:
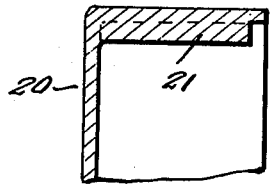
Figure 2 is a central vertical section through the structure illustrated in Figure 1.

The general assembly of parts may well be seen in Figure 2. In this figure it will be observed that the relatively fixed assembly of elements is specifically composed of the stationary axle flange 8 provided with circumferentially spaced retaining pins 9 on which the openwork frame 10 is slidably arranged. This frame as shown in Figure 1 comprises inner and outer ring-like portions 11 and 12 joined together through the intermediacy of radial webs 13 formed with eyes 14 slidably embracing the pins 9.

The numeral 15 designates an intervening annulus having circumferentially spaced apertured ears 16 also surounding said pins. On each pin, I provide a pair of coil springs 17 and 18, said springs bearing at their inner ends against the ears 16, the outer ends of the springs 17 bearing against the eyes 14 and the corresponding ends of the inner springs 18 bearing against the flange 8. The parts 8, 10 and 15 are provided with fabric facings 19 composed of brake lining material.

The relatively rotatable brake drum, carried by the wheel is distinguished by the numeral 20 and is provided with circumferentially spaced ribs 21 which serve as keys to accommodate the retaining lugs 22 carried by the marginal edge portions of the complemental rings 23. There are two of these rings and they are keyed to the drum to rotate therewith, one ring being interposed between the annulus 15 and the brake flange 8, the other ring being interposed between said annulus and the frame 10. These rings function as the frictional braking surfaces for the drum.

The numeral 24 designates a yoke whose arm portions are pivotally attached by way of bolts 25 to the frame 10 as seen in Figure 1. A fork 26 is pivotally attached to the extremity of each arm of the yoke, said fork being carried on an adjusting and actuating bolt 27 which is adjustably secured to the flange 8 through the medium of retaining and adjusting nuts 28. The actuating rod is distinguished by the numeral 29 and has a bifurcated end whose furcations are joined by a coupling pin 30 to the crown portion of the yoke as also shown in Figures 1 and 2.

I call attention to Figure 6 wherein it will be observed that the numerals 31 designate a plurality of blades carried by the brake drum to serve as fan blades. Manifestly, the rotation of the brake drum with the vehicle wheel (not shown) serves to cause these blades to circulate the air for cooling the frictional braking elements.

In operation, it is obvious that the rockably mounted yoke is actuated through the medium of the operating rod 29, said yoke serving to shift the frame 10 in a direction toward the flange 8, thereby compressing the coiled springs, and firmly gripping the brake drum rings 23 between the brake linings. Manifestly, when the yoke is released, the springs come into play to automatically expand the parts 10 and 15 to brake releasing position.

In order to appreciate the features of structural distinction, it is necessary to check over some of the salient factors and points of novelty. First, I wish to emphasize the "fullfloating" idea, that is, the arrangement allowing a wheel to be removed while the brakes are set. This is permitted by reason of the fact that the friction producing rings of the brake drum assembly are detachably connected with the flange of the drum through the medium of coacting lugs and keys. Otherwise stated, the rings have quick-separable connection with the brake drum.

Another feature is predicated upon the provision of a brake that is non-energizing, allowing forward or backward movement.

Another feature is based upon an arrangement wherein the effective braking surface can be diminished or augmented by varying the number of "disks" to meet the requirements of the anticipated braking load.

A still further point is found in the simplified structure insuring ease of application and releasing of the braking action through the intermediacy of dependable, quick replaceable and interchangeable brake band surfaced elements.

In the preceding detailed description, I have been explicit in the recitation of parts. In order that the following claim may be more satisfactorily interpreted, I desire that the parts denoted by the numerals 8, 10, and 15 cooperate in producing a relatively stationary or fixed unit each of said elements being provided with brake bands and joined together by pins and cooperable springs in order to produce an automatically expansible and mechanically contractible unit wherein the compressible or contractible action is produced through the use of a simple pivoted yoke carried by the frame 10, which yoke has its extremities or arms adjustably anchored to the flange 8 by way of a stress-producing bolt 27. Incidently, this bolt arrangement permits the sensitivity of action of the brake to be effectively regulated. In other words, it permits the brakes to be easily tightened. Broadly, the part 10 is described as a frame, and more specifically as a spring compressing and pressure producing member. Moreover, although the essential friction producing parts are of annular construction they may nevertheless be referred to as "disks" in the broad sense of the word.

It is thought that persons skilled in the art to which the invention relates will be able to obtain a clear understanding of the invention after considering the description in connection with the drawings. Therefore, a more lengthy description is regarded as unnecessary.

Minor changes in shape, size, and rearrangement of details coming within the field of invention claimed may be resorted to in actual practice, if desired.

I claim:

A vehicle brake comprising a stationary flange, pins carried thereby and projecting from the outer face of the flange, an annular pressure frame slidably arranged on said pins, an annulus interposed between the flange and frame and slidably supported on said pins, spring means located between the pressure frame and flange and tending to press the frame away from the flange, a yoke having its arms pivotally mounted on the frame, a pair of members adjustably connected with the flange and to which the extremities of the arms of the yoke are pivotally connected whereby movement of the yoke toward the flange will press the frame toward the flange, an operating member passing through the flange and connected to the bight of the yoke, a friction ring located between the frame and the annulus, a second friction ring located between the annulus and the flange, a drum adapted to be connected to a part of a wheel and enclosing the frame, the annulus and the friction rings, with the edge of its rim located adjacent the outer circumference of the flange, transversely arranged projections carried by the drum and parts on portions of the outer circumferences of the friction rings slidably engaging the projections for holding said rings against rotary movement relative to the drum.

JOSEPH M. MILAN.